United States Patent
Foti et al.

(10) Patent No.: US 7,120,156 B2
(45) Date of Patent: Oct. 10, 2006

(54) POLICY INFORMATION TRANSFER IN 3GPP NETWORKS

(75) Inventors: George Foti, Dollard des Ormeaux (CA); Sorin Surdila, Laval (CA)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 772 days.

(21) Appl. No.: 09/904,626

(22) Filed: Jul. 16, 2001

(65) Prior Publication Data

US 2003/0012205 A1 Jan. 16, 2003

(51) Int. Cl.
H04L 12/28 (2006.01)

(52) U.S. Cl. .............. 370/401; 370/229; 370/392; 709/223

(58) Field of Classification Search .......... 370/352, 370/401
See application file for complete search history.

(56) References Cited

U.S. PATENT DOCUMENTS

| | | | |
|---|---|---|---|
| 6,044,399 A | 3/2000 | Elledge | 709/220 |
| 6,094,687 A | 7/2000 | Drake, Jr. et al. | 709/241 |
| 6,167,025 A | 12/2000 | Hsing et al. | 370/216 |
| 6,286,052 B1* | 9/2001 | McCloghrie et al. | 709/238 |
| 6,611,864 B1* | 8/2003 | Putzolu et al. | 709/223 |
| 6,680,943 B1* | 1/2004 | Gibson et al. | 370/392 |
| 6,708,209 B1* | 3/2004 | Ebata et al. | 709/223 |
| 6,711,172 B1* | 3/2004 | Li | 370/401 |
| 6,714,515 B1* | 3/2004 | Marchand | 370/231 |
| 6,910,074 B1* | 6/2005 | Amin et al. | 709/227 |
| 6,963,573 B1* | 11/2005 | Cain et al. | 370/401 |
| 6,988,133 B1* | 1/2006 | Zavalkovsky et al. | 709/223 |
| 7,003,578 B1* | 2/2006 | Kanada et al. | 709/230 |
| 7,082,102 B1* | 7/2006 | Wright | 370/229 |
| 2002/0181462 A1* | 12/2002 | Surdila et al. | 370/392 |
| 2002/0194369 A1* | 12/2002 | Rawlins et al. | 709/238 |

FOREIGN PATENT DOCUMENTS

| | | |
|---|---|---|
| EP | 1 094 649 | 4/2001 |
| WO | WO 99/60459 | 11/1999 |
| WO | WO 00/42761 | 7/2000 |

OTHER PUBLICATIONS

Mameli et al., "Use of COPS for Intserv Operations over Diffserv: Architectural Issues, Protocol Design and Test-bed Implementation", IEEE Communications, Jun. 2001, pp. 3265-3270.*
D. Durham et al., The COPS (Common Open Policy Service) Protocol, Network Working Group, RFC 2748, Jan. 2000.
G. Gross et al., COPS Usage for SIP, Internet Draft, SIP Working Group, Apr. 2001.
PCT Search Report of Nov. 7, 2002, received in corresponding PCT application PCT/CA02/01032.
Diana Rawlins et al.: *RSVP Policy Control Criteria PIB*, Internet Draft, Mar. 2001.

* cited by examiner

Primary Examiner—Ricky Q. Ngo
Assistant Examiner—Michael J. Moore, Jr.
(74) Attorney, Agent, or Firm—Sandra Beauchesne, Ericsson Canada Inc.

(57) ABSTRACT

The invention relates to policy information transfer in 3GPP networks. A Policy Decision Point (PDP) that deals with more than one Policy Enforcement Point (PEP) has a table associating IP addresses with PEPs so that it knows what PEP to send the policy information to. The invention also provides methods for keeping the table updated and transferring the information to the right PEP, and a protocol that is used for messages from the PEP to the PDP.

4 Claims, 4 Drawing Sheets

| IP Address | Primary PEP | Secondary PEP |
|---|---|---|
| x.y.1.1-x.y.1.100 | PEP a1 | PEP b1 |
| x.y.1.101-x.y.1.255 | PEP a2 | PEP b2 |
| . | . | . |
| . | . | . |
| x.y.4.63-x.y.4.99 | PEP a15 | PEP b15 |

Figure 2

POLICY INFORMATION TRANSFER IN 3GPP NETWORKS

BACKGROUND OF THE INVENTION

1. Technical Field of the Invention

The present invention relates to telecommunications, and particularly to transfer of policy information in 3GPP networks.

2. Description of Related Art

FIG. 1 shows a block chart of a prior art telecommunication network 100 that will be used to describe the prior art and the problem solved by the present invention.

The telecommunication network 100 is to at least a certain extent a Third Generation Partnership Project (3GPP), as for example a core network 102 in connection with three access networks 104, 106 and 108, via a gateway (GW) each 114, 116 and 118, respectively. In 3GPP different kinds of access networks, such as for example GPRS, packet cable and UMTS, may share the same core network and the access networks are to a high degree transparent as to data packets sent from the core network to devices in the access network, and carrying Session Initiation Protocol (SIP) information. In network 3 106, that in this example is a GPRS/UMTS network, there is a terminal A 120 that is used by user A (not shown), and the gateway 116 is a Gateway GPRS Serving/Support Node (GGSN). In addition, the core network 102 comprises a number of routers 110 that routes data packets sent through the core network 102 towards the intended recipients.

The core network 102 is connected to other networks, such as to A's home network 130 through a Proxy Call State Control Function 122 (P-CSCF) for SIP signalling via connection 126, and to network 140 (B network), for data traffic via connection 128. A terminal 142 used by user B (not shown) resides in the B network 140. The P-CSCF 122 comprises an IP Policy Control 124 (IPPC) and A's home network 130 comprises a Serving Call Session Control Function 132 (S-CSCF). The function of these nodes will be described hereinafter. Furthermore, there is also a connection 134 between A's home network 130 and the B network 140.

In the following explanatory scenario it is assumed that user A desires to contact user B, via their respective terminals 120 and 142. Terminal A 120, a GPRS capable terminal, has access to the access network 106 and has been allocated an IP address as result of a Packet Data Protocol (PDP) Context activation procedure. This IP address is one of the IP addresses that 'belong' to the access network 106 and the IP address is used to send data to the device 120. Each access network is assigned a group of, usually consecutive, IP addresses, and the groups are disjunct from IP addresses used by other access networks.

To set up a connection with terminal B 142, terminal A sends a SIP message to the P-CSCF 122 through a low bandwidth channel (not shown), transparently via the GGSN 116, giving the user identity, such as the phone number, of terminal B 142. The P-CSCF 122, contacts the S-CSCF 132 in A's home network 130. The S-CSCF 132 in turn contacts the B network 140 in order to contact terminal B 142. It should be noted that the B network 140 need not be a 3GPP network, and that the exact method of contacting terminal B 142 thus may differ. At this point there is a control signalling path (not shown) from terminal A 120 to terminal B 142

During or after this contacting procedure, a bearer is reserved between the GGSN 116 and the B network 140. This bearer takes another route than the signalling path, normally the shortest (or cheapest) way to terminal B 142, which in this case is through the core network 102—possibly via a number of routers 110—and connection 128 directly to the B network 140 and from there to terminal B 142.

When user B accepts the incoming call, a response message, such as for example a Session Initiation Protocol (SIP) "200 OK" message, is propagated towards the P-CSCF 122. When this message reaches the P-CSCF 122, it informs the IPPC 124 that the reserved bearer can be "opened". The IPPC 124 then sends an order to the GGSN 116 to allow terminal A to send traffic data packets, such as speech data, through the bearer to terminal B 142. The two users may then continue to send data packets until it is decided to terminate the connection, at which point a Disconnect message is sent the same way as the response message hereinbefore, finally resulting in that the GGSN 116 thereafter denies terminal A 120 any use of the bearer.

Thus it should be clear that signalling packets and traffic packets follow different routes through the network 100. A problem with this separation of routes is that there is a need for some interaction between the signalling path and the bearer for SIP sessions that require a special Quality of Service (QoS) better than "best effort". This is to ensure that the signalling path and the bearer correspond to each other in order to e.g. prevent denial of service attacks and theft of service. Another reason is that the gateway needs to be certain that the bearer is only used as allowed; a user is charged only when a call is active, i.e. between the time when it is accepted and the time it is disconnected, and a user should not be allowed to send any traffic data packets outside this time frame, as he would not be billed for them.

The aforementioned interaction is provided by the IPPC 124 that acts as a Policy Decision Point (PDP) and the gateway that acts as a Policy Enforcement Point (PEP). This is to say that the PDP decides the access policy that should be used and sends the policy to the PEP that enforces it, e.g. by allowing or denying a device access to the core network. A preferred protocol for communication between the PDP and the PEP is the Common Open Policy Service Protocol (COPS) and the 3GPP standard specifies that information should be 'pushed' to the recipient, i.e. sent to the recipient without first having been asked for the information.

Using the PDP and the PEP, the PDP (IPPC 124) receives from the P-CSCF 122 the necessary information to validate a request for a certain QoS. It then pushes its decision to the relevant PEP that resides in the gateway. However, the only information about a user's whereabouts available to the P-CSCF 122 and the IPPC 124 is the user's IP address, so the PDP must have a way of knowing which PEP is the relevant one. There is currently no known way the PDP can know this, at least not in an environment where a PDP is in contact with more than one PEP.

Furthermore, the information about which PEP is the proper PEP is dynamic. If a gateway is out of service another PEP should preferably be used instead. Thus the IP addresses previously reached through a certain PEP (with address x) could be reassigned to another PEP (with address y). In addition, enabling multiple PEPs is needed to allow load sharing, redundancy, etc.

It can therefore be appreciated that there is a need for a solution that solves this problem of knowing to which PEP the PDP should push information. This invention provides such a solution.

SUMMARY OF THE INVENTION

The present invention is directed to a table for associating an Internet Protocol (IP) address with a Policy Enforcement Point (PEP). The table comprises a column for a range of IP addresses and a column for the corresponding PEP, and a number of rows, each row listing an IP address range and its associated PEP.

The present invention is further directed to a Policy Decision Point (PDP) comprising a stored data record of at least one Internet Protocol (IP) address range and an associated Policy Enforcement Point (PEP).

The present invention is further directed to a method for updating a data record associating an Internet Protocol (IP) address range with a Policy Enforcement Point (PEP), wherein the data record resides in a network node. The method comprises steps of sending by the PEP to the network node a message comprising the IP addresses it is assigned, and upon reception of the message by the network node, updating the corresponding data record.

The present invention is further directed to a method for updating a data record associating an Internet Protocol (IP) address range with a Policy Enforcement Point (PEP), wherein the data record resides in a network node. The method comprises steps of sending by the PEP routing information to the network node, and upon reception of the routing information at the network node extracting the IP addresses assigned to the PEP and updating the data record.

The present invention is further directed to a method for sending policy information from a Policy Decision Point (PDP) to a Policy Enforcement Point (PEP). The method comprises steps of reading by the PDP from a table associating IP addresses and PEPs, the PEP associated with the certain IP address, and sending the policy information to the PEP associated with the IP address.

The present invention is further directed to a Common Open Policy Service Protocol (COPS) for communication between a Policy Decision Point (PDP) and a Policy Enforcement Point (PEP). The COPS's Client Open (OPN) message further comprises a field listing the IP addresses assigned to the PEP.

BRIEF DESCRIPTION OF THE DRAWINGS

A more complete understanding of the present invention may be had by reference to the following Detailed Description when taken in conjunction with the accompanying drawings wherein:

FIG. 2 depicts a table linking IP addresses and Policy Enforcement Points (PEPs) according to the invention;

DETAILED DESCRIPTION OF EMBODIMENTS

Figure 1:
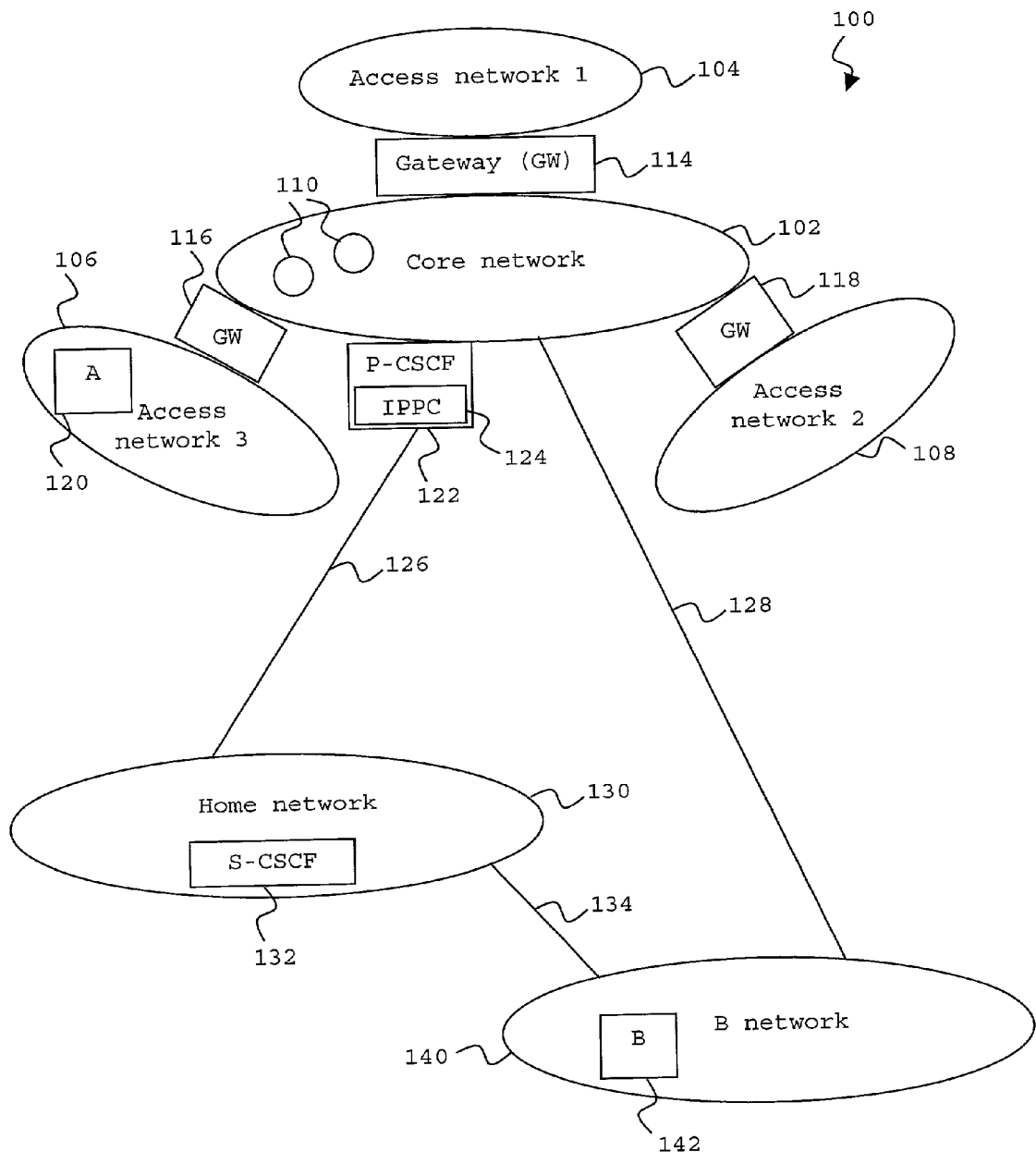
FIG. 1 depicts a prior art telecommunications network.

Reference is again made to the Drawings, where FIG. 1 shown hereinbefore depicts an exemplary prior art telecommunications network and where FIG. 2 depicts an exemplary table 201 linking IP addresses and PEPs according to the invention. The table 201 resides in a Policy Decision Point (PDP) 200, such as for example an updated version of the IP Policy Control (IPPC) 124 in the Proxy Call State Control Function (P-CSCF) 122 in the exemplary Third Generation Partnership Project (3GPP) 100 network in FIG. 1. The table 201 has three columns 202–204, where the leftmost column 202 has a number of entries of IP addresses; in the exemplary table in ranges, but it should be understood that the range could also be a single IP address. The middle column 203 lists the primary PEP associated with a certain IP address and the rightmost column 204 lists the secondary PEP associated with the IP address.

The primary PEP is the one the PDP 200 will contact in a normal case, but if the PDP 200 has received an indication that the primary PEP is not working as it should, e.g. if a COPS Keep Alive message was not received on time, then the PDP 200 will choose the secondary PEP.

The table 201 further comprises a number of rows 210–215, where the topmost row 210 is a label row used for understanding, although it is not necessary for the PDP 200 to find which PEP that corresponds to a certain IP address. The rest of the rows, 211–215 lists data entries, i.e. an IP address range, and the corresponding primary and secondary PEP.

As can easily be seen from the exemplary table 201, IP address x.y.1.150 corresponds to primary PEP a2 and secondary PEP b2.

Using the lookup table 201 and an IP address, the PDP 200 can easily find out which is the proper PEP for that IP address, simply by finding the row that matches the IP address and then reading the identity of the primary PEP, the secondary PEP, or both. The PDP 200 can then send policy information regarding a certain IP address to the PEP.

The table 201 can be provisioned by the operator or it can be created and updated automatically, as described hereinafter (see FIGS. 3 and 4).

It should be understood that the table 201 may well comprise further columns that the two columns 203–204 that list the primary and secondary PEP. These further columns may for example list tertiary and further PEPs. It should further be understood that the information comprised in the table 201 may be stored in other kinds of stored data records.

A person skilled in the art will also appreciate that the table 201 will not be useful to its full extent if the information therein is not up to date. There is thus a need for a method that updates the table 201.

Figure 3:
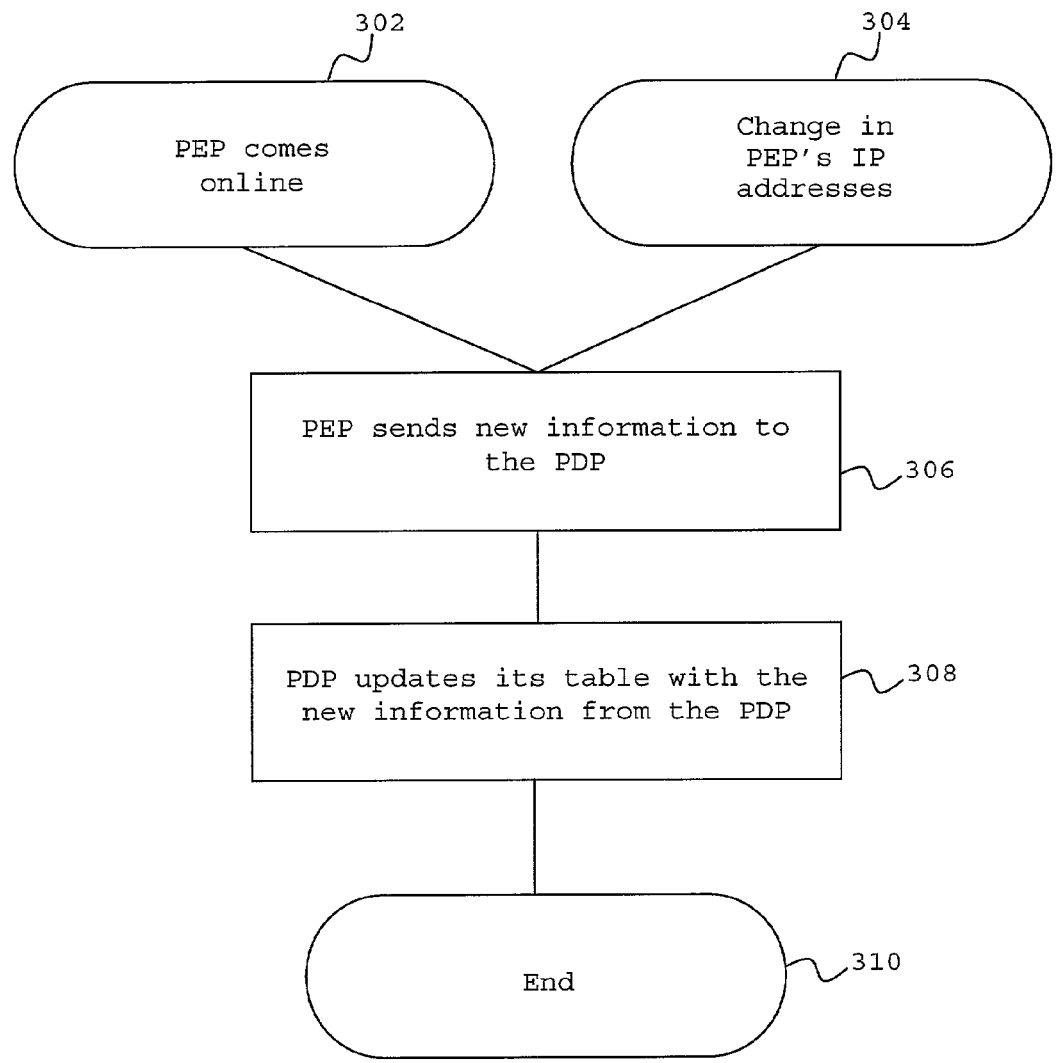
FIG. 3 depicts a flow chart illustrating a first embodiment of a method according to the invention.

FIG. 3 depicts a flow chart illustrating a first embodiment of the method for keeping the PDP's table updated according to the invention. There are two main steps in which the method could start, step 302 and step 304, although it should be appreciated that the PDP's table may have to be updated in other cases than the ones listed. In step 302, a PEP comes online, and it is assumed that it already has been assigned a number of IP addresses. The PEP may be new, or it may be an old PEP that comes online again after having been offline, and the PDP may or may not have updated its table to reflect that it was offline. In step 304, on the other hand, a PEP has had a change in the IP addresses that it is assigned. The PEP may have been assigned new IP addresses, had one or more IP addresses removed, or a combination thereof.

Once the PEP is online or has changed its IP addresses, the next step 306 is to contact the PDP to inform the latter of the changes, i.e. to send the information to the PDP.

If the PEP came online, then this information transfer may be part of the initial contacting or negotiating procedure, such as for example in the COPS "Client Open" procedure, in which case the Client Open (OPN) message comprises a new field listing the IP addresses assigned to the PEP.

If IP addresses assigned to the PEP has changed, it sends a message to the PDP, either listing all the IP addresses it is currently assigned or only the changes to the IP addresses, e.g. "added x.y.z.1–50; removed x.y.z.51–100". Using COPS, this may be done by sending a Report (RPT) message comprising a new field with the IP address information.

Upon reception of the information, the PDP updates its table in step 308, after which the method ends; step 310.

It is important to remember that it is not only the PEP as such, but the entire gateway that is associated with certain IP addresses, and that, apart from the PDP, other nodes in the network need to know what IP addresses are assigned to a certain gateway. Without this information, the other nodes cannot for example route packets address to a certain IP address to the right place. Although not part of the method, the gateway informs other nodes in the network about its routing abilities using standard prior art methods. This information should be done in conjunction with the update of the PDP's table, as the information has to match.

Figure 4:
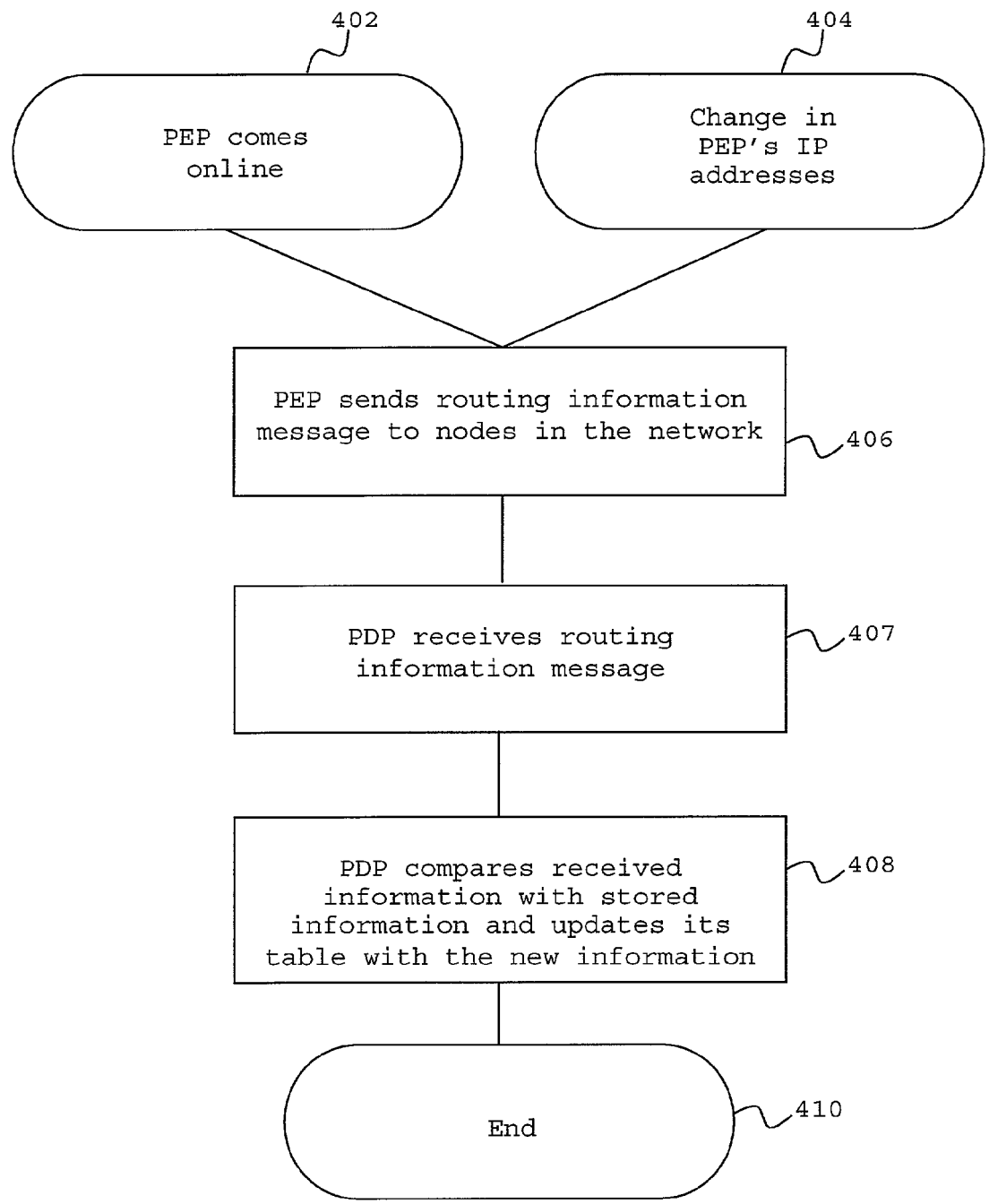
FIG. 4 depicts a flow chart illustrating a second embodiment of a method according to the invention.

FIG. 4 depicts a flow chart illustrating a second embodiment of the method for keeping the PDP's table updated according to the invention. As in the embodiment described in FIG. 3, there are two main steps in which the method could start, step 402 and step 404, although it should be appreciated that the PDP's table may have to be updated in other cases than the ones listed. In step 402, a gateway, including a PEP, comes online, and it is assumed that it already has been assigned a number of IP addresses. The PEP may be new, or it may be an old PEP that comes online again after having been offline, and the PDP may or may not have updated its table to reflect that it was offline. In step 404, on the other hand, a gateway, and consequently the corresponding PEP, has had a change in the IP addresses that it is assigned. The PEP may have been assigned new IP addresses, had one or more IP addresses removed, or a combination thereof.

Once the gateway (and PEP) is online or has changed its IP addresses, the next step 406 is to send the information to other nodes in the network. This may be done using a standard routing information protocol, such as for example Routing Information Protocol (RIP), Open Shortest Path First (OSPF), Exterior Gateway Protocol (EGP) and Border Gateway Protocol (BGP).

From a PEP's perspective, the PDP is one of the network nodes that need to be involved in the routing information exchange (i.e. it is seen as a neighbouring router) The PDP is set to understand the protocol used for routing information exchange, and hence, once a message is received, it extracts the necessary information (i.e. the IP addresses handled by a certain gateway). This information is compared with the stored information, and if a modification is detected, the PDP updates its table in step 408, after which the method ends; step 410.

Although several preferred embodiments of the methods, systems and nodes of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for transferring policy information in an Internet Protocol (IP) network from a network node comprising a table, the table comprising a plurality of records, the method comprising the steps of:

at the network node, listing in each of the plurality of records of the table at least two Policy Enforcement Points (PEP) with a range of IP addresses;

in the network node, with a specific IP address, finding one of the plurality of records from the table corresponding to the specific IP address, wherein the specific IP address is within the range of IP addresses of the one of the plurality of records;

in the network node, reading a first one of the at least two PEPs in the one of the plurality of records;

from the network node, sending policy information to the first PEP;

upon reception at the network node of an indication that the first PEP is not working, reading a second one of the at least two PEPs in the one of the plurality of records; and from the network node, sending policy information to the second PEP.

2. The method according to claim 1, wherein in the step of listing in each of the plurality of records of the table at least two PEPs, the range of IP addresses represents a single IP address.

3. The method according to claim 1, wherein the step of listing in each of the plurality of records of the table the at least two PEPs is performed by an operator of the IP network.

4. The method according to claim 1, wherein the network node resides in a Third Generation Partnership Project (3GPP) network, the 3GPP being part of the IP network.

* * * * *